Figure 19:
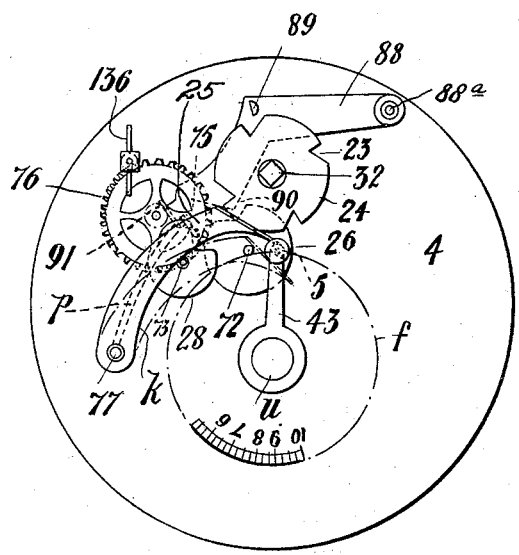

No. 869,081. PATENTED OCT. 22, 1907.
H. W. HARRIS.
TIME CONTROLLED GAS COCK.
APPLICATION FILED MAY 22, 1905.
4 SHEETS—SHEET 1.
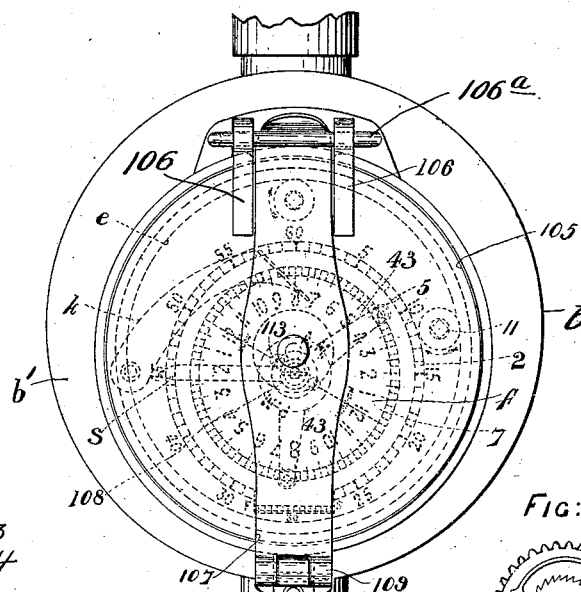
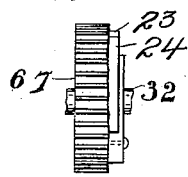
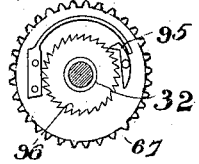
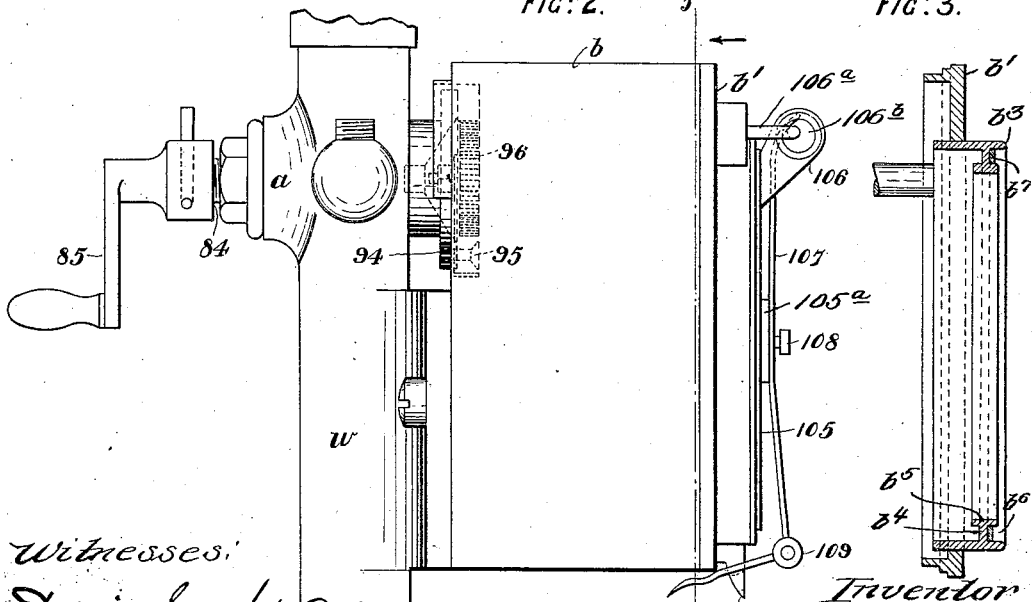
Witnesses:
Inventor
Harry W. Harris
By James L. Norris
Attys.

No. 869,081. PATENTED OCT. 22, 1907.
H. W. HARRIS.
TIME CONTROLLED GAS COCK.
APPLICATION FILED MAY 22, 1905.
4 SHEETS—SHEET 2.
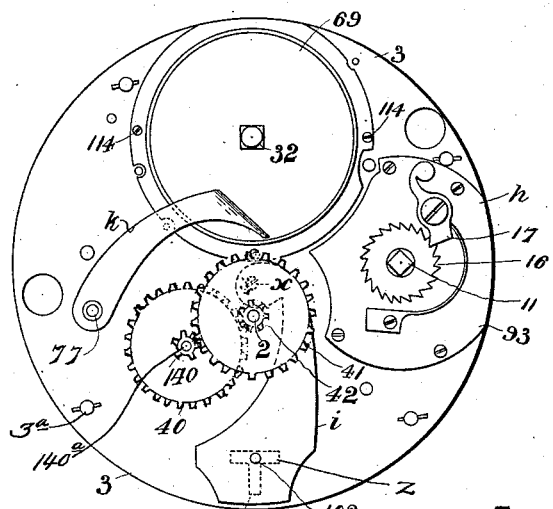
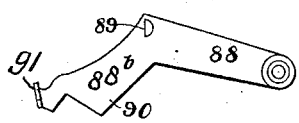 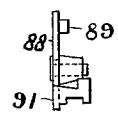 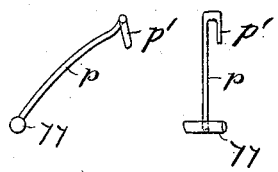
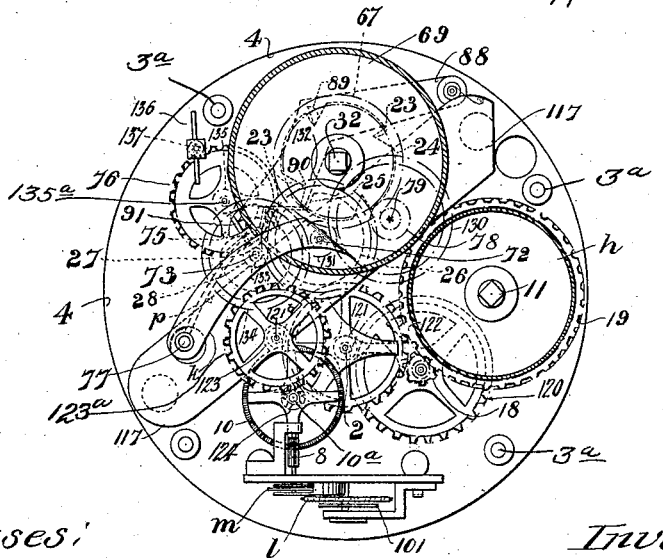
Witnesses:
Dennis Sumby
C. D. Kesler
Inventor
Harry W. Harris
By James L. Norris
Atty.

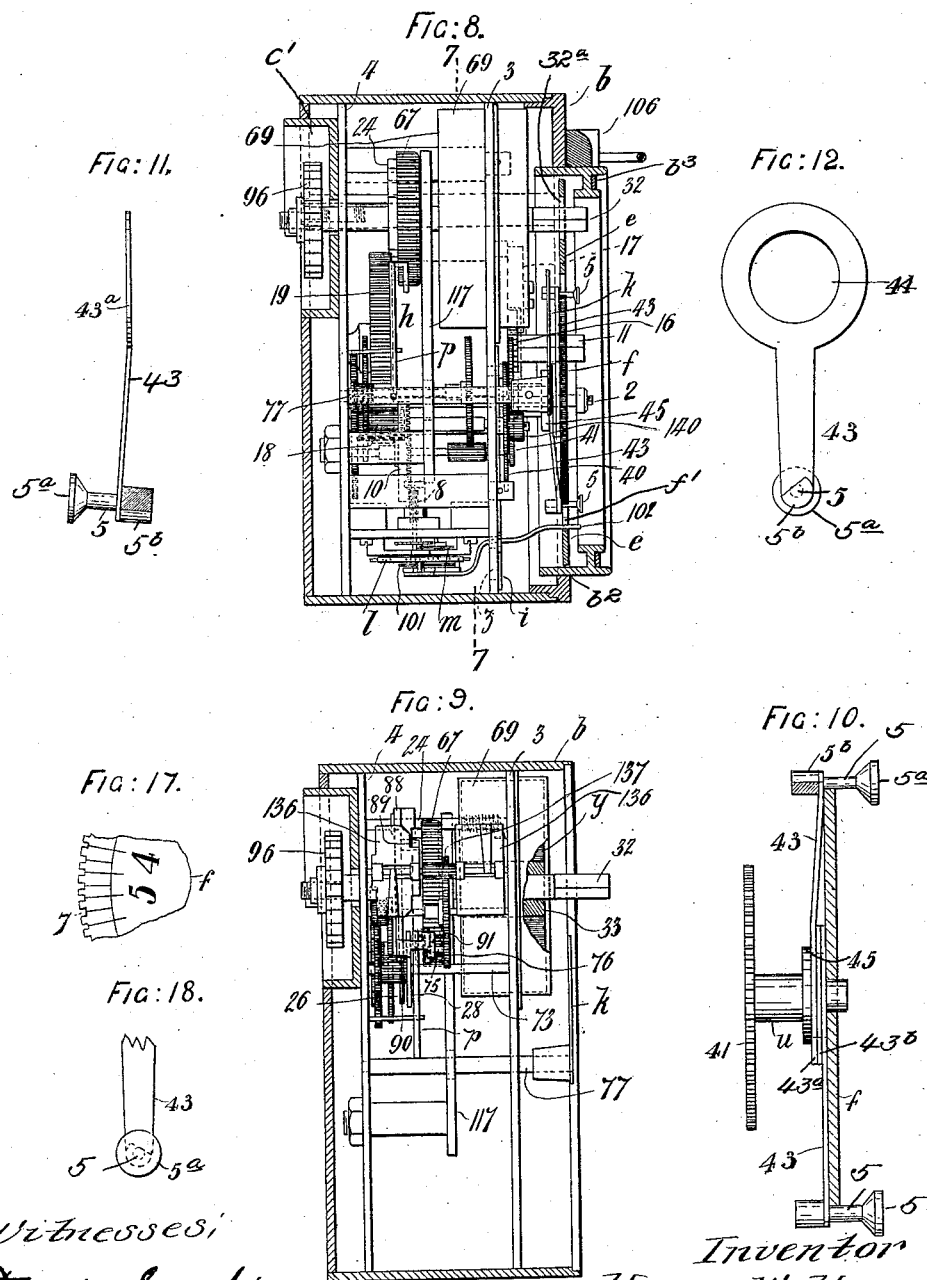

No. 869,081. PATENTED OCT. 22, 1907.
H. W. HARRIS.
TIME CONTROLLED GAS COCK.
APPLICATION FILED MAY 22, 1905.

4 SHEETS—SHEET 4.

Witnesses:
Inventor
Harry Wightman Harris
By
James L. Norris.

UNITED STATES PATENT OFFICE.

HARRY WIGHTMAN HARRIS, OF BROCKLEY, ENGLAND.

TIME-CONTROLLED GAS-COCK.

No. 869,081.          Specification of Letters Patent.          Patented Oct. 22, 1907.

Application filed May 22, 1905. Serial No. 261,623.

*To all whom it may concern:*

Be it known that I, HARRY WIGHTMAN HARRIS, a subject of the King of Great Britain, residing at 56 Brockley road, Brockley, in the county of Kent, England, inspector in the employ of a gas company, have invented certain new and useful Improvements in Time-Controlled Gas-Cocks, of which the following is a specification.

This invention relates to time controlled gas cocks; and the object thereof is to provide an apparatus in a manner as hereinafter set forth for controlling the supply of gas, steam, water or other fluids at predetermined times, and is furthermore adapted for switching on and off an electrical supply.

The invention further aims to provide a time controlled gas cock which shall be simple in its construction, strong, durable, efficient in its use, readily set up and comparatively inexpensive to manufacture.

With the foregoing and other objects in view, the invention consists of the novel construction, combination and arrangement of parts hereinafter more specifically described and illustrated in the accompanying drawings wherein is shown the preferred embodiment of the invention, but it is to be understood that changes, variations and modifications can be resorted to which come fully within the scope of the claims hereunto appended.

In the drawings—Figure 1 is a front view of the apparatus. Fig. 2 is a side view with the apparatus attached to the gas cock. Fig. 3 is a sectional view of the casing at the front thereof. Fig. 4 is a detail view of the motor gear and ratchet and pawl for controlling the movement of the gas cock. Fig. 5 is a detail. Fig. 6 is a sectional view on line 5—5 of Fig. 2. Fig. 7 is a section on line 7—7 of Fig. 2. Fig. 8 is a longitudinal sectional view of Fig. 2. Fig. 9 is another longitudinal section with some of the parts removed. Fig. 10 is a detail view partly in section of the dial and gear therefor. Fig. 11 is a detail view of the setting arm and top pin. Fig. 12 is an elevation of the same. Figs. 13 and 14 are detail views of the motor arresting lever. Fig. 15 is a detail view of the releasing lever for the motor. Fig. 16 is an end view thereof. Fig. 17 is a fragmentary view of the rotating dial. Fig. 18 is a fragmentary view of one of the setting arms and trip pins. Fig. 19 is an elevation of the cam disks, a setting arm, trip pin and releasing lever, showing their relative positions in the frame. Fig. 20 is a front elevation of the apparatus with the cover removed, and, Fig. 21 is a sectional side elevation.

In the drawings the letter $w$ designates a gas pipe having a plug $a$ constituting a cut-off or stop cock and which is provided with a stem 84 projecting from opposite sides of the plug $a$. One end of the stem 84 is connected with a spring motor mechanism, as will be hereinafter described, said motor mechanism actuating the stem when occasion so requires. The other end of the stem 84 has attached thereto a handle 85 so that the stem can be actuated manually independent of the motor mechanism. Affixed to the gas pipe $w$ in proximity to the plug $a$ is a casing $b$ which is formed with a removable front section $b'$, having a circular opening $b^2$ for receiving a ring $b^3$, the latter having an inwardly extending flange $b^4$ terminating in a band $b^5$, forming intermediate the latter and the ring $b^3$ a recess $b^6$ for receiving a packing $b^7$.

A door 105 is provided for the section $b'$. The door carries a pair of apertured offsets 106 through which extends a bail $106^a$ attached to the section $b'$, the openings $106^b$ in the offsets 106 being of much greater diameter than the bail $106^a$ so that the hinged connection formed by the offsets and bail will be a loose one. The outer face of the door 105 is formed approximately centrally thereof with a protuberance $105^a$ against which is secured by the holdfast device 108 a spring locking bar 107. The latter at its upper end bears against the longitudinal portion of the bail $106^a$ and at its lower end has a hasp 109 hinged thereto adapted to take over a catch 110 depending from the section $b'$. The cover 105 has its rim $105^b$ extending into the recess $b^6$ and engaging the packing ring $b^7$. When the hasp 109 takes over the catch 110 the locking bar 107 bearing against the cover 105 will cause the rim $105^b$ of the latter to bear tightly against the packing ring $b^7$ and form a seal, thereby preventing dust or other foreign matter from entering the casing $b$ through the ring $b'$.

Within the casing $b$ is arranged a pair of pillar plates 3, 4 which are suitably spaced apart by the pillars $3^a$ and are adapted to support the clock and motor mechanisms to be hereinafter referred to.

Within the section $b'$ is fixed a flat ring $e$ having its front face provided circumferentially thereof with indicating marks to designate the minute intervals, as well as serving to set the clock work to time. Within the fixed ring $e$ and spaced therefrom is arranged a rotating dial $f$ with the indications thereon divided to represent hours and quarter hours in two divisions, night and day. The spacing of the dial $f$ from the ring $e$ forms a passage $f'$ for a purpose hereinafter referred to.

The reference character 2 denotes the main staff of the clock mechanism, the staff 2 projecting from the dial $f$ and carrying on its outer end a minute hand $s$. The staff 2 has a bearing in the pillar plates 3, 4 and is surrounded by a hollow arbor or sleeve $u$ which is attached to the dial $f$ and is driven from the clock mechanism so as to revolve once every twenty-four hours, a like rotation being imparted to the dial $f$. The sleeve $u$ is rotated through the medium of a gear 41 carried on the inner end of the sleeve $u$ and which meshes with a pinion 140. The latter is carried by a spindle 140ᵃ to which a gear 40 is secured, the latter being driven by a pinion 42 fixed upon the spindle 2.

The edge of the dial f is toothed as at 7 and adapted to engage in such teeth is a pair of adjustable trip pins 5 for throwing into operation the motor mechanism to actuate the stem 84 of the cut-off so as to open and close the gas or other supply. Each of the pins 5 is provided on its outer end with a knob 5ᵃ which facilitates the adjusting of the pins. The inner end 5ᵇ of each of the pins is substantially semi-circular in cross section and sufficiently large to cause the resilient oscillatory actuating lever k of the motor mechanism, which is engaged and actuated by the pin, to leave the pin at a predetermined time. The construction of the trip pins 5 is clearly shown in Figs. 10, 11 and 12. Each of the pins 5 is carried by a spring arm 43 having an enlarged apertured inner end 43ᵃ which is mounted upon the sleeve u and retained in position against longitudinal displacement by the shoulder 45, the inner ends 43ᵃ of the arms 43 being separated by a washer 43ᵇ. The pins 5 are shifted from the teeth by a disengaging pressure on the knobs 5ᵃ and can be readily adjusted to any position of engagement with the teeth 7 so as to cause the operation of the lever k at predetermined intervals to cause the release and operation of the motor mechanism. When the pins 5 have been adjusted, their engagement with the teeth 7 will cause them to be carried around with the dial during the rotation thereof.

The clock mechanism is provided with a balance wheel l and an escapement m which are located between the pillar plates 3, 4. The balance wheel l is geared with the clock train by a pinion 8 carried on the axis 8ᵃ of the balance wheel and which meshes with a crown gear 10 forming a part of the clock train. The hair spring of the clock mechanism is indicated by the reference character 101 and is regulated by an arm 102 which extends through a slot z in the plate 3 and an opening in a pivoted closure member i. The arm 102 is of such length as to project into the channel f′ so it can be conveniently reached for manipulation. The member i is pivoted as at x to the plate 3 and is adapted to close the opening z so as to exclude dust from the interior of the case b.

The main spring arbor 11 of the clock mechanism has a bearing at one end in a detachable plate 93 attached to the pillar plate 3 and at its other end in a detachable plate (not shown) which is secured to the pillar plate 4. The arbor 11 is revolved to wind up the spring barrel h by a loose key applied thereto. A ratchet 16 is carried by the arbor 11 and which is engaged by a spring-pressed pawl 17 to arrest movement of the arbor. When the pawl 17 is moved out of the path of the ratchet 16, the arbor 11 is released and barrel h revolved. The barrel h carries a toothed wheel 19 which meshes with the pinion 18 of the clock train, thereby imparting motion to the latter when the arbor 11 is released. In this connection it will be stated that the pinion 18 transmits motion to the wheel 120 which in turn gears with the pinion 121. On the shaft 121ᵃ of the pinion 121 is a wheel 122 gearing with a pinion 123. On the shaft 121ᵇ of the pinion 123 is a wheel 123ᵃ which gears with a pinion 124 on the axis 10ᵃ of the crown gear 10 through which motion is imparted to the pinion 8 of the escapement m.

The motor mechanism which is released at predetermined intervals through the medium of the clock mechanism, comprises an arbor 32 for the spring barrel 69 and which has its bearings in the plate 4 and stationary box 69.

The motor spring y within the barrel 69 has one end attached to the rim thereof and its other end attached to a collet 33 fixed to the arbor 32. The forward end of the latter projects through an opening 32ᵃ formed in the ring e so that the arbor can be conveniently engaged by a key when occasion so requires. Mounted upon the arbor 32 is the toothed wheel 67 which gears with the motor train and in this connection it will be stated that the wheel 67 gears with a pinion 78 mounted upon a spindle 79 for transmitting motion to a wheel 130 fixed to the spindle 79. The wheel 130 gears with a pinion 131 upon a spindle 72. The latter carries a wheel 132 which in turn gears with a pinion 133 upon a spindle 73 imparting thereby motion to a wheel 134 carried by the spindle 73. The wheel 134 meshes with a pinion 135 on the spindle 135ᵃ of the stop wheel 76.

The toothed wheel 67 carries a cam 24 having peripheral recesses 23, corresponding to the "on" and "off" positions of the cock a. The said recesses 23 are adapted to receive a lug 89 on the locking lever 88 so as to arrest movement of the wheel 69. The lever 88 is loosely mounted on a spindle 88ᵃ and is formed with an angular depending extension 88ᵇ having a bent end 91 and a projection 90 on its lower edge. The bent end 91 and projection 90 are adapted to engage respectively, in a recess 28ᵃ in a cam 28 and a recess 25 in a cam 26. The bent end 91 and projection 90 engage in their respective recesses simultaneously with the engagement of the lug 89 in one of the recesses 23. The cams 26 and 28 are mounted, respectively, upon the spindles 72, 73.

The actuating lever k is mounted upon a spindle 77; the latter also carries a stop lever p which acts intermittently and engages a stop 75 upon the wheel 76. Normally, the lever k lies in the path of the pins 5 so that during the travel of the pins 5 they will alternately engage and shift the lever k, such action rocking the spindle 77 and elevating the lever p simultaneously with the shifting of the lever k. When the lever p is elevated it lifts locking lever 88 owing to the engagement of the bent end p′ of the lever p with the bent end 91 of the lever 88. When the lever 88 is lifted by the lever p the bent end 91, projection 90 and lug 89 are moved out of the recesses 23, 25 and 28ᵃ of the cams 23, 26 and 28. By disengaging the lever 88 from the cams in the manner as stated the motor train is released until the wheel 76 shifts the stop 75 to contact with the bent end p′ of the lever p which action discontinues the operation of the motor train. When the lever k passes off the pin 5 which is supporting it, the lever k falls and causes the bent end p′ of the lever p to be moved out of the path of the stop 75; the motor train is then free to run and the stem 84 of the gas cock is actuated. The motor train continues to run until the bent end 91, projection 90 and lug 89 engage in the recesses of the cams 24, 26, 28, which action takes place when the lug 89 moves off the high part of the cam 24 allowing of the lever 88 to fall by gravity.

The cams 24, 26 and 28 are so arranged and timed that the bent end 91, projection 90 and lug 89 of the lever 88 engage them when the next recess 23 on the cam 24 comes opposite the lug 89; the bent end 91 then simultaneously comes in contact with the stop 75 on the wheel 76 and thereby arrests the operation of the motor. Three cams 24, 26 and 28 are used in order that the lever 88 will have time to clear the depression of cam 24. If two cams only were used there would be a danger of the projection 90 of lever 88 (which engages the depression of cam 26) reëngaging the depression of cam 26 before it should do so as said cam 26 makes a complete revolution before the depression 23 of cam 24 has rotated clear of lever projection 89, whereas the periphery of cam 28 prevents the lever 88 from falling until the next depression of cam 24 comes opposite projection 89 when the depressions of the three cams come opposite their respective projections 89, 90 and 91 of the lever 88 and simultaneously engage the same, allowing the lever 88 to fall when it will engage the pin 75 on stop wheel 76.

In order to minimize the retardation of the motor mechanism in operation, the lever 88 is raised by the cam 28 until it clears the recess 25 in the cam 26; it then rides on the periphery of the cam 26 until it clears recess 23 of the cam 24; it then rides upon the periphery of cam 24, and at this stage the lever 88 will be out of contact with the cams 26 and 28 until the succeeding recess 23 of cam 24 comes opposite the lug 89. At this stage the lever 88 will lower and the lug 89 enter recess 23, projection 90 will enter recess 28ª and bent end 91 enter recess 25 allowing the free end of the lever 88 to contact with stop 75.

At one end of the stem of the gas cock and fitting into a recess $c'$ formed in the casing $b$ is a disk 94 to which is attached a spring-pressed pawl 95 normally engaging with the teeth of the ratchet wheel 96, so that when the motor operates, the disk 94 will be revolved and the stem of the cock actuated.

When it is desired to manually turn on or off the supply, such operation is had through the medium of the handle 85 carried by the spindle 84, which in turn is connected to the motor mechanism, and, in order to avoid operating such mechanism during the manual operation of the gas cock, the ratchet 96 mounted upon the arbor 32 is released and permits of the requisite free and independent movement of the gas cock.

The lever $k$ is so shaped that if the pins 5 are forced or carried in a backward direction they will engage the bevel face (as shown in Fig. 7) of this lever, which being resilient, gives, and allows the pins to pass without injury to them or to the lever.

The apparatus, the main parts of which are shown in Fig. 2, is intended to be supported on the gas supply pipe $w$, but it can be socketed for use in the "base" of a lamp.

The outer dial $e$ is used for convenience to enable an attendant to very quickly set them to time, i. e. to the minute, otherwise without a minute hand $s$ on outer dial $e$ this could not be done so accurately but only to within seven and one-half or fifteen minutes—as the inner rotating dial has only one-fourth hour divisions marked upon it and if a number of apparatus were in use at one time in the streets they would not all light up together if no minute hand was used for setting them to correct time. When the base of a lamp is so used, suitable connection, as by a disk wheel, eccentric pin, connecting link and crank arm, are used to convey the motion from the motor spindle 32 to the spindle of the gas cock plug, or the equivalent part to be actuated.

In applying this mechanism to the regulation of electrical switches or analogous uses, the necessary connections are made to the valve, switches, or the like devices to be moved. For electricity, insulated switches and their appropriately forced contacts are substituted for the gas cock plugs and coöperating adjuncts.

What I claim is—

1. In an apparatus for operating a cut-off, the combination with a spring-actuated motor mechanism operated at predetermined intervals, connected with and adapted when operated to alternately open and close said cut-off, of a combined locking and releasing means for said motor mechanism, said means comprising an oscillatory actuating lever, a combined releasing and stop lever shiftable to and from normal position when the actuating lever is operated, a series of rotatable recessed controlling cams, one of which is connected to the main shaft of the motor mechanism, a locking lever provided with means engaging in said cams to arrest the movement thereof, said locking lever shiftable from engagement with said cams on the movement of said combined releasing and stop lever, and a time-controlled tripping device for intermittently shifting the actuating lever in one direction.

2. In an apparatus for operating a cut-off, the combination with means operated at predetermined intervals and connected with the cut-off for alternately opening and closing it and embodying a stop device for temporarily arresting the movement thereof, of a combined locking and releasing means for said motor mechanism, said means comprising an oscillatory actuating lever, a combined releasing and stop lever shiftable to and from normal position when the actuating lever is operated and adapted to engage said stop device to temporarily arrest the operation of said means, a series of rotatable recessed controlling cams, one of which is connected to said means, a locking lever adapted to engage in said cams to arrest the movement thereof, thereby discontinuing the operation of said means for a predetermined time, said locking lever shiftable from engagement with said cams by said combined releasing and stop lever, and a time-controlled tripping device for intermittently shifting the actuating lever in one direction, causing thereby the shifting of the locking lever from engagement with said cams by said combined releasing and stop lever.

3. In an apparatus for operating a cut-off, the combination with means operated at predetermined intervals and connected to the cut-off and adapted when operated to alternately open and close it, of a combined locking and releasing mechanism for said means, said mechanism comprising an oscillatory actuating lever, a combined releasing and stop lever, said levers mounted on a common axis and operating simultaneously, a series of rotatable recessed controlling cams, one of which is connected to said means, a locking lever engaging in said cams to arrest the movement thereof, said locking lever shiftable from engagement with said cams to release said means to allow of the operation thereof and the actuation of the cut-off on the movement in one direction of said combined releasing and stop lever, combined with a time-controlled tripping device for intermittently shifting the actuating lever at predetermined intervals.

4. In an apparatus for operating a cut-off at predetermined intervals, a spring-actuated motor mechanism connected with and adapted when operated to open and close the cut-off, an oscillatory actuating lever, a combined releasing and stop lever, said levers mounted on a common axis and operating simultaneously, three rotatable recessed controlling cams, one of which is connected to the main shaft of the motor mechanism, a locking lever provided with means engaging in said cams to arrest the movement thereof, said locking lever shiftable from engagement with said cams on the movement of said combined releasing and stop lever, said locking lever when moved from engagement with said cams temporarily retained in a non-engaging position by one of said cams, means adapted to be engaged by said combined releasing and stop lever for temporarily arresting the operating of the motor mechanism, combined with a time-controlled tripping device for intermittently shifting the actuating lever at predetermined intervals.

5. In an apparatus for operating a cut-off at predetermined intervals, a spring-actuated motor mechanism connected with and adapted when operated to open and close the cut-off, an oscillatory actuating lever, a combined releasing and stop lever, said levers mounted on a common axis and operating simultaneously, three rotatable recessed controlling cams, one of which is connected to the main shaft of the motor mechanism, a locking lever provided with means engaging in said cams to arrest the movement thereof, said locking lever shiftable from engagement with said cams on the movement of said combined releasing and stop lever, said locking lever when moved from engagement with said cams temporarily retained in a non-engaging position by one of said cams, means adapted to be engaged by said combined releasing and stop lever for temporarily arresting the operation of the motor mechanism, a pair of trip pins adapted to intermittently shift the actuating lever in one direction at predetermined intervals, and a clock mechanism carrying the trip pins.

6. In an apparatus for operating a cut-off at predetermined intervals, a spring-actuated motor mechanism connected with and adapted when operated to open and close the cut-off, an oscillatory actuating lever, a combined releasing and stop lever, said levers mounted on a common axis and operating simultaneously, three rotatable recessed controlling cams, one of which is connected to the main shaft of the motor mechanism, a locking lever provided with means engaging in said cams to arrest the movement thereof, said locking lever shiftable from engagement with said cams on the movement of said combined releasing and stop lever, said locking lever when moved from engagement with said cams temporarily retained in a non-engaging position by one of said cams, means adapted to be engaged by said combined releasing and stop lever for temporarily arresting the operation of the motor mechanism, trip pins adapted to alternately engage with said actuating lever for shifting it in one direction at predetermined intervals, a clock mechanism embodying a revolving element, and means for connecting the trip pins to the revolving element so that said pins will be carried thereby.

7. In an apparatus for operating a cut-off, the combination with a spring-actuated motor mechanism operated at predetermined intervals, connected with and adapted when operated to alternately open and close said cut-off, of a combined locking and releasing means for said motor mechanism, said means comprising an oscillatory actuating lever, a combined releasing and stop lever shiftable to and from normal position when the actuating lever is operated, a series of rotatable recessed controlling cams, one of which is connected to the main shaft of the motor mechanism, a locking lever provided with means engaging in said cams to arrest the movement thereof, said locking lever shiftable from engagement with said cams on the movement of said combined releasing and stop lever, a time-controlled tripping device for intermittently shifting the actuating lever in one direction, combined with means independent of the motor mechanism to allow of the opening and closing of the cut-off manually.

8. In an apparatus for operating a cut-off, the combination with means operated at predetermined intervals and connected with the cut-off for alternately opening and closing it and embodying a stop device for temporarily arresting the movement thereof, of a combined locking and releasing means for said motor mechanism, said means comprising an oscillatory actuating lever, a combined releasing and stop lever shiftable to and from normal position when the actuating lever is operated and adapted to engage said stop device to temporarily arrest the operation of said means, a series of rotatable recessed controlling cams, one of which is connected to said means, a locking lever adapted to engage in said cams to arrest the movement thereof thereby discontinuing the operation of said means for a predetermined time, said locking lever shiftable from engagement with said cams by said combined releasing and stop lever, a time-controlled tripping device for intermittently shifting the actuating lever in one direction, causing thereby the shifting of the locking lever from engagement with said cams by said combined releasing and stop lever, combined with means independent of the motor mechanism to allow of the opening and closing of the cut-off manually.

In testimony whereof I have hereunto set my hand in presence of two subscribing witnesses.

HARRY WIGHTMAN HARRIS.

Witnesses:
ALFRED GEORGE BROOKES,
ALFRED G. W. BROOKES.